Patented July 28, 1953

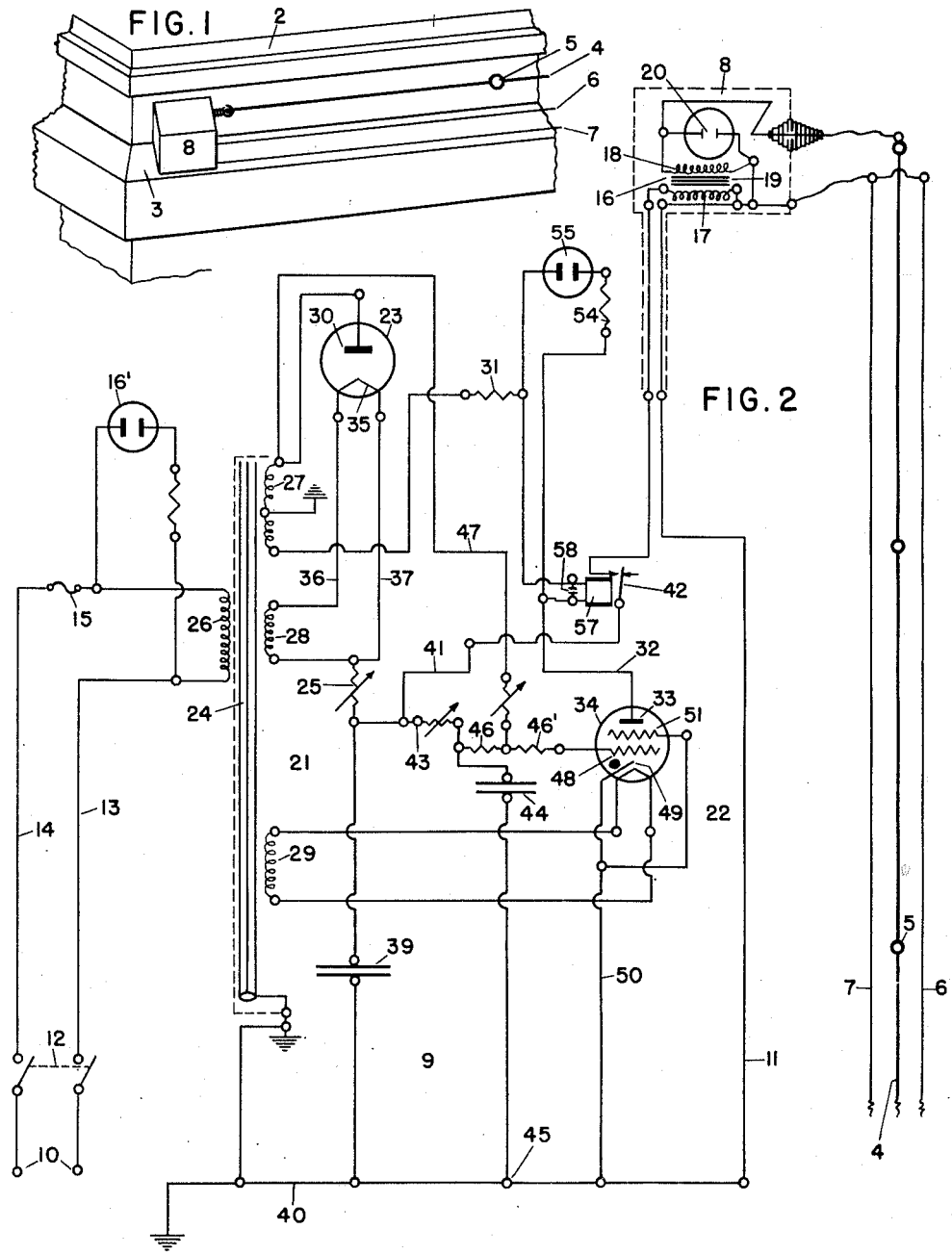

2,647,228

UNITED STATES PATENT OFFICE 2,647,228

APPARATUS FOR CONTROLLING BIRD NUISANCE

John H. Just, Syracuse, N. Y., assignor, by mesne assignments, to Eli Gingold, Syracuse, N. Y.

Application May 12, 1948, Serial No. 26,660

1 Claim. (Cl. 317—262)

This invention relates to apparatus for controlling bird nuisance and, more particularly, to apparatus for installation on buildings or other structures upon which pigeons, starlings or other birds congregate creating undesirable conditions, which serves to chase or drive birds from such chosen resting places thus alleviating or eliminating such undesirable conditions. The term "bird nuisance" is used herein to define a condition in which birds congregate at a resting place and render the vicinity of such resting place unattractive and unpleasant due to the raucous din they create, their droppings, and the like.

The chief object of the present invention is to provide apparatus which may be readily installed to control bird nuisance.

An object of the present invention is to provide apparatus which may be economically and readily installed on building structures to chase or drive away birds from their chosen gathering places.

A further object is to provide apparatus for eliminating bird nuisance in which a radiating wire is disposed at or adjacent the resting places of the birds so that any bird which enters its zone of radiation induces the discharge of a spark toward it.

A still further object is to provide an inexpensive electronic circuit for supplying energy to a radiating wire disposed adjacent the resting places of birds whereby a bird entering the field of the wire induces the discharge of a spark which chases or drives it away. Other objects of my invention will be readily perceived from the following description.

This invention relates to apparatus for controlling bird nuisance which comprises a field-producing high voltage wire adapted to be disposed adjacent a ledge of a building or similar bird gathering place and means to supply energy to such wire whereby induced spark energy is collected and discharged from the wire toward a bird which enters the electrostatic field set up by the high voltage wire.

The attached drawing illustrates a preferred embodiment of my invention, in which Figure 1 is a fragmentary view of a building structure provided with the apparatus of my invention; and Figure 2 is a diagrammatic view of the apparatus of my invention.

Referring to the drawing, there is shown in Figure 1 a fragmentary portion of a building structure designated at 2, provided with the present apparatus for controlling bird nuisance. The building structure 2 may include a ledge 3 or similar resting place at which birds gather and create a nuisance by noise, etc. Disposed adjacent ledge 3 is a high voltage field-producing wire 4 strung on insulators 5 and extending in a direction parallel to the ledge but spaced perhaps two to three inches above the ledge. Two parallel ground wires 6 and 7 spaced about five inches apart extend along the ledge parallel to the field-producing wire 4.

The field-producing wire 4 is connected to an induction unit 8 disposed adjacent the area in which wire 4 is placed. Unit 8 is connected to a control unit 9 which preferably is designed for remote control of induction unit 8 rendering it unnecessary to place a high voltage wire near frequented places and eliminating shock or annoyance to persons who might inadvertently approach such wire.

The control unit 9 is connected to a suitable source of power 10, which may be the usual commercial source such for instance as 115 volts, alternating current. As shown in Figure 2, the output of the unit is connected to wire 4 and to ground through a conductor 11. An on-off switch 12 is disposed in the alternating current power connection wires 13 and 14 to control supply of power to the apparatus. A fuse 15 is disposed in wire 14. Preferably, a neon indicator tube 16' visible on the panel of control unit 9 is connected to wires 13 and 14 to indicate to the operator when alternating current is applied to the unit from the source of power 10.

Induction unit 8 contains an induction coil 16 having primary winding 17 constituting input-energizing connections, secondary winding 18, and a core 19 suitable for fast changes in the magnetic field, insulated to withstand high voltage. The induction unit 8 also includes a safety gap 20 to limit an induced spark impulse to a safe value which is irritating and disturbing but not fatal or dangerous to the bird.

The control unit 9 includes a power supply and automatic control means for induction unit 8, indicated generally by numerals 21 and 22. The apparatus is so constructed and arranged as to furnish a surge current to primary winding 17 of the induction coil 16. The surge current causes a high intensity spark to build up in secondary winding 18 of coil 16; secondary winding 18 is connected to field-producing wire 4 and hence such spark will leap from wire 4 to any bird which approaches within the field of wire 4. The distance of the spark and the time interval thereof is controlled by the control means 21, 22.

Referring now specifically to Fig. 2, the power supply and control 21, 22 is seen to include a transformer 24 having a primary 26 and three secondaries 27, 28, 29; a half-wave rectifier 23 having a plate 30 and a heater 35; a thyratron tube 34 having control electrodes or grids 48, 51, and a plate-cathode gap section consisting of the plate 33 and the cathode heater 49; and a normally open relay switch having an operating coil 57.

The plate 30 of the half-wave rectifier, is connected to one terminal of the secondary 27 which is center-tapped to ground, the other terminal of the secondary being connected to the resistor 31, and thence to the plate 33 of the thyratron tube 34 by circuit connector 32. The secondary 28 is arranged to provide heater potential for the cathode-heater 35 of the rectifier tube, while the secondary 29 likewise provides heater potential for the cathode-heater of the thyratron tube 34.

The direct current output derived from the rectifier 23 on lead 37 is applied through a resistor 25, shown to be variable, to one terminal of the main condenser 39 which may be of 8 microfarads capacity. The main condenser 39 has its other terminal connected to a common ground connection 40 which is connected as a ground for one terminal of the transformer primary 17 by lead 11. The common junction of the main condenser 39 and the series resistor 25 is connected to the control grid or electrode 48 by variable isolating resistor 43 and the center-tapped resistor 46, 46'. The center-tapped resistances 46, 46' prevent excess currents on the grid 48 of the thyratron 34 and provide a D. C. component for grid excitation.

A timing condenser 44 has one terminal connection to the common junction of the variable resistance 43 and the resistor section 46 and has its other terminal connected to the common ground 40. An alternating component of grid excitation is provided from the terminal of the transformer 27 common to the rectifier plate 30, by lead 47 and a variable resistor, not numbered. As is well understood in the art, the thyratron 34 having its control grid 48 connected to both the alternating current and direct current sources, is continuously controlled and will periodically breakdown between its plate 33 and cathode 49. The provision of the variable resistances respectively in the A. C. and D. C. drives for the thyratron, facilitates adjustment of the resistance values to provide proper thyratron firing potential only when the main condenser 39 is sufficiently charged to deliver the required high voltage impulse to the primary 17 of the induction coil 16. Since the details of this type of thyratron control are well known, further description will be dispensed with as superfluous.

The plate 33 of the thyratron 34 is connected in series with the operating winding 57 for the normally open relay switch. A connection with the alternating current source is provided through lead 32, resistance 54, the neon tube indicator 55, and resistance 31 to the terminal of the secondary winding 27 remote from the terminal connected to the rectifier 23. As is well understood, a fixed condenser 58 is connected across the terminals of the relay coil 57 to smooth out operation of the switch 42. When the switch contacts of the relay switch 42 are closed, in dependence upon firing of the thyratron, the charge existing across the main condenser 39 will be delivered to the primary of the induction coil 16 by lead 41 and the closed switch contacts 42. The resultant high intensity voltage across the secondary 18 of the induction unit 8 will cause a high voltage electrostatic field to be built up about the field-producing wire 4. Thereupon, a bird coming within the field will cause a high voltage spark to jump through the air, the discharge path going from the field-producing wire 4 to the bird, and thence to ground, such as wires 6, 7.

In actual operation, upon closing the line switch 12, the thyratron control tube 34 will periodically fire. As previously pointed out, firing of the tube will depend upon combined grid excitation respectively derived from the alternating current and direct current sources via the appropriate variable resistances. When the tube fires, the contacts of relay switch 42 will close to complete the circuit between the high potential terminal of the main condenser 39 and the primary 17 of the conduction coil 16. The voltage built up across the induction coil 16 is then delivered to the field-producing wire 4 causing appropriate shocking of a bird coming into the field of the wire 4.

The present invention provides inexpensive equipment which assures the control and elimination of bird nuisance from building structures or similar places where birds tend to congregate. My apparatus is highly effective in use in driving or chasing birds from places which they have selected as resting and gathering places. While perhaps after my apparatus has been used for a short period of time an occasional bird may return to such gathering place, the nuisance and annoyance inherent in the gathering of large flocks of birds at such places is definitely eliminated.

My apparatus serves to collect and discharge a spark toward a bird which approaches within the corona of the high voltage wire, such spark being sufficiently powerful to penetrate the feathers of the bird and permanently discourage and frighten it away from the gathering place or roost but insufficient to endanger the life of the bird. The spark is of very short duration, timed to be periodic and highly effective in use. The equipment is so arranged and constructed as to avoid a high voltage wire adjacent frequented places so that use thereof is not dangerous to human life. The induction unit may be placed adjacent the place of use and remotely controlled to assure safety to human life.

While I have described a preferred embodiment of my invention it will be understood my invention is not limited thereto since it may be otherwise embodied within the scope of the following claim.

I claim:

In an apparatus for controlling bird nuisance, a field-producing wire adapted to be connected above ground at a bird-gathering place, a high-voltage induction unit having its output connected between said field-producing wire and ground and having input-energizing connections, direct current and alternating current sources, a main condenser, a charging resistor in series with said main condenser and connecting the latter to said direct current source, a relay switch including an operating winding and normally-open switch contacts, circuit connections including said switch contacts for connecting said input-energizing connections across said main condenser, a thyratron including a control electrode and a plate-cathode discharge section, said plate-cathode discharge section being connected in series with said operating winding and said alternating current source, and a resistance-capacitance control circuit for said thyratron, said control circuit including a first isolating resistor in series with said control electrode and said alternating current source, and a second isolating resistor connected between said control electrode and the common junction of said main condenser and said charging resistor, said isolating resistors being proportioned to provide a thyratron firing potential only when said main condenser is in condition to energize said induction unit.

JOHN H. JUST.

References Cited in the file of this patent

UNITED STATES PATENTS

| Number | Name | Date |
|---|---|---|
| 252,599 | Connelly | Jan. 24, 1892 |
| 1,952,588 | Golden | Mar. 27, 1934 |
| 2,071,958 | Watrous | Feb. 23, 1937 |
| 2,073,428 | Schmid | Mar. 9, 1937 |
| 2,127,898 | Webster | Aug. 23, 1938 |
| 2,210,211 | Levenburg | Aug. 6, 1940 |
| 2,259,570 | Klumb | Oct. 21, 1941 |
| 2,343,300 | Klumb | Mar. 7, 1944 |
| 2,350,187 | Pfeiffer | May 30, 1944 |
| 2,400,829 | Kennedy | May 21, 1946 |
| 2,415,944 | Fagen | Feb. 18, 1947 |

OTHER REFERENCES

Engineering News-Record, December 6, 1945, page 11 (volume page 761), "Shocked Seagulls Sidestep Seattle."

Electric Fences, by C. F. Dalziel, A. I. E. E. technical paper, 50-2, October 28, 1949, esp. page 16.